(12) United States Patent
Cho

(10) Patent No.: US 8,205,521 B2
(45) Date of Patent: Jun. 26, 2012

(54) DUAL CLUTCH TRANSMISSION WITH A DEVICE FOR PREVENTING DOUBLE ENGAGEMENT

(75) Inventor: Hang Cheol Cho, Hwaseong (KR)

(73) Assignee: Hyundai Motor Company, Seoul (KR)

(*) Notice: Subject to any disclaimer, the term of this patent is extended or adjusted under 35 U.S.C. 154(b) by 797 days.

(21) Appl. No.: 12/274,123

(22) Filed: Nov. 19, 2008

(65) Prior Publication Data

US 2009/0139355 A1    Jun. 4, 2009

(30) Foreign Application Priority Data

Dec. 3, 2007  (KR) .................. 10-2007-0124356

(51) Int. Cl.
*B60K 20/00* (2006.01)
(52) U.S. Cl. ..................... 74/473.36; 74/473.1

(58) Field of Classification Search .............. 74/330, 74/331, 335, 339, 340, 473.36–473.37, 473.1, 74/473.11, 473.12
See application file for complete search history.

(56) References Cited

U.S. PATENT DOCUMENTS

| | | | | |
|---|---|---|---|---|
| 6,026,698 A * | 2/2000 | Weston | | 74/335 |
| 2008/0127760 A1 * | 6/2008 | John et al. | | 74/335 |

* cited by examiner

*Primary Examiner* — Justin Holmes
*Assistant Examiner* — Huan Le
(74) *Attorney, Agent, or Firm* — Morgan, Lewis & Bockius LLP

(57) ABSTRACT

A dual clutch transmission may include: a control bar including a hole; a first rail and a second rail that are respectively disposed along the control bar; first springs biasing the first rail and the second rail respectively; a first stopper and a second stopper that are mounted in respective inner grooves of the first rail and the second rail; second springs that elastically support the stoppers and insert the stoppers into the hole according to the movement of the rails; and a first release rug and a second release rug selectively holding the stoppers.

17 Claims, 9 Drawing Sheets

DUAL CLUTCH TRANSMISSION WITH A DEVICE FOR PREVENTING DOUBLE ENGAGEMENT

CROSS-REFERENCE TO RELATED APPLICATION

The present application claims priority to Korean Patent Application No. 10-2007-0124356 filed Dec. 3, 2007, the entire contents of which application is incorporated herein for all purposes by this reference.

BACKGROUND OF THE INVENTION

1. Field of the Invention

The present invention relates to a dual clutch transmission, and more particularly to a dual clutch transmission that prevents gears from double engagement and that smoothly operates gear shifting.

2. Description of Related Art

A dual clutch transmission includes two clutches in a transmission case so as to shift gear.

Generally, the dual clutch transmission uses two clutches to selectively transmit torque that is input from an engine to two input shafts, and the gears that are mounted on the two input shafts are engaged selectively from each other such that a gear shift can be operated.

The dual clutch transmission embodies a high speed compact transmission higher than a fifth speed Also, a synchronizing device and an automated shift gear (ASG) are used to help a manual shift in the dual clutch transmission.

Generally, the clutch is disconnected so that a shift is securely operated, after the shift the clutch is connected to transfer engine torque to a wheel. However, while the first clutch is connected to the engine, a gear that is disposed in the second clutch is simultaneously connected to the engine in the double clutch system.

This is called pre-selection. The odd speeds are connected to the first clutch and the even speeds are connected to the second clutch.

For example, while a vehicle is running in a fourth speed by using the second clutch in accordance with a running state of the vehicle, a third speed gear or a fifth speed gear is previously rotated according to the rotation of the first clutch.

Accordingly, in order to shift from the third speed to the fifth speed, it is necessary that the third speed gear is disengaged and the fifth speed gear is engaged. While likewise, in order to shift from the fifth speed to the third speed, it is necessary that the fifth speed gear is disengaged and the third speed gear is engaged.

That is, a mechanism is necessary to disengage the third speed gear and engage the fifth speed gear, and vice versa, wherein the mechanism is to be swiftly and repeatedly operated.

Accordingly, a device for preventing double engagement, that is, for preventing the third speed and the fifth speed from being simultaneously engaged, has been developed, however, there is a problem in which the structure of the device is complicated and several actuators are required to be used.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a dual clutch transmission having advantages of preventing gears from double engagement, such as when shifting from fifth speed to third speed.

In an aspect of the present invention, a dual clutch transmission that is equipped with a double clutch, includes a first clutch and a second clutch, and a device for preventing double engagement, wherein the device for preventing double engagement may include control bar in which a hole is formed from a first surface to a second surface that is opposite to each other, a first rail and a second rail that are respectively disposed along the first surface and the second surface of the control bar, first springs that respectively bias the first rail and the second rail to maintain a neutral position in a normal state, a first stopper and a second stopper that are mounted in respective inner grooves of the first rail and the second rail and in which the end portions thereof are disposed to protrude from the first surface and the second surface thereof second springs that elastically support the first and second stoppers and insert the first or second stopper into the hole according to the movement of the first or second rails, and/or a first release rug and a second release rug that respectively extends from the first rail and the second rail along the third surface and the fourth surface of the control bar, wherein a dent, in which the first or second stopper is mounted, is formed in the middle of an end surface of the first and second release rugs, and a knoll is formed adjacent to the dent so as to push the first or second stopper according to the movement of the first or second rail.

A groove may be formed on the first and second surface of the control bar and the first and second stoppers are mounted in the groove and thereby the first or second rail is positioned in the neutral position in the normal state.

The groove may be formed adjacent to the hole.

The groove may be symmetrically formed around the hole.

The first stopper may be disposed at both sides based on the first release rug and the second stopper may be disposed at both sides based on the second release rug.

A first fork and a first shift rug for shifting may be connected to the first rail.

A second fork and a second shift rug for shifting may be connected to the second rail.

In another aspect of the present invention, a dual clutch transmission that is equipped with a double clutch, including a first clutch and a second clutch, and a device for preventing double engagement, wherein the device for preventing double engagement may include a control bar including an upper surface and lower surface, a hole, and grooves, wherein the hole is configured to pass through the upper surface and lower surface and the grooves are formed near the hole, a first rail and a second rail that are respectively disposed on and below the control bar, first spring biasing the first rail to maintain a neutral position in a normal state, second spring biasing the second rail to maintain a neutral position in a normal state, a first stopper and a second stopper that are mounted in respective inner grooves of the first rail and the second rail and in which the end portions thereof are disposed to selectively protrude from the upper surface and the lower surface, second springs that elastically support the first and second stoppers and insert the first or second stoppers into the hole according to the movement of the first or second rail, and/or a first release rug and a second release rug that respectively extend from the first rail and the second rail along the third surface and the fourth surface at both sides of the control bar, wherein a dent, in which the first or second stopper mounts, is formed in the middle of an end surface of the first and second release rugs, and a knoll is formed adjacent to the dent so as to push the first or second stopper according to the movement of the first or second rail.

In further another aspect of the present invention, a dual clutch transmission that is equipped with a double clutch, including a first clutch and a second clutch, and a device for preventing double engagement, wherein the device for preventing double engagement may include first and second cases, first control bar disposed at the middle of the inside of the first case and extending in a longitudinal direction thereof, second control bar disposed at the middle of the inside of the second case and extending in a longitudinal direction thereof, wherein a hole is formed between one end portion of the first control bar and one end portion of the second control bar, a first rail slidably disposed on first surfaces of the first and second control bars, a second rail slidably disposed on second surfaces of the first and second control bars, first elastic member and second elastic member that respectively bias the first and second rails to maintain a neutral position in a normal state, a first stopper mounted in an inner groove of the first rail and one end of which protrudes toward the first control bar, the first stopper moving in the first case, wherein a third elastic member supports the first stopper and selectively inserts the first stopper into the hole according to the movement of the first rail, a second stopper mounted in an inner groove of the first rail and one end of which protrudes toward the second control bar, the second stopper moving in the second case, wherein a fourth elastic member supports the second stopper and selectively inserts the second stopper into the hole according to the movement of the first rail, a third stopper mounted in an inner groove of the second rail and one end of which protrudes toward the first control bar, the third stopper moving in the first case, wherein a fifth elastic member supports the third stopper and selectively inserts the third stopper into the hole according to the movement of the second rail, a fourth stopper mounted in an inner groove of the second rail and one end of which protrudes toward the second control bar, the fourth stopper moving in the second case, wherein a sixth elastic member supports the fourth stopper and selectively inserts the fourth stopper into the hole according to the movement of the second rail, a first release rug extending from the first rail between the first and second stoppers, the first release rug including a dent to selectively receive the third or fourth stopper and a knoll formed adjacent to the dent to selectively release the third or fourth stopper according to movement of the first rail, and/or a second release rug extending from the second rail between the third and fourth stoppers, wherein the second release rug includes a dent to selectively receive the first or second stopper and a knoll formed adjacent to the dent to selectively release the first or second stopper according to movement of the second rail.

First and second grooves may be formed on the first surface of the respective first and second control bars at the one end thereof and third and fourth grooves are formed on the second surface of the respective first and second control bars at the one end thereof, the first and second stopper being mounted in the first and second grooves to maintain the first rail in the neutral position in the normal state and the third and fourth stopper being mounted in the third and fourth grooves to maintain the second rail in the neutral position in the normal state.

The first, second, third, and fourth grooves may be formed adjacent to the hole.

The first and second grooves may be symmetrically formed with respect to the hole and the third and fourth grooves may be symmetrically formed with respect to the hole.

A first fork for shifting may be connected to the first rail. A second fork for shifting may be connected to the second rail.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
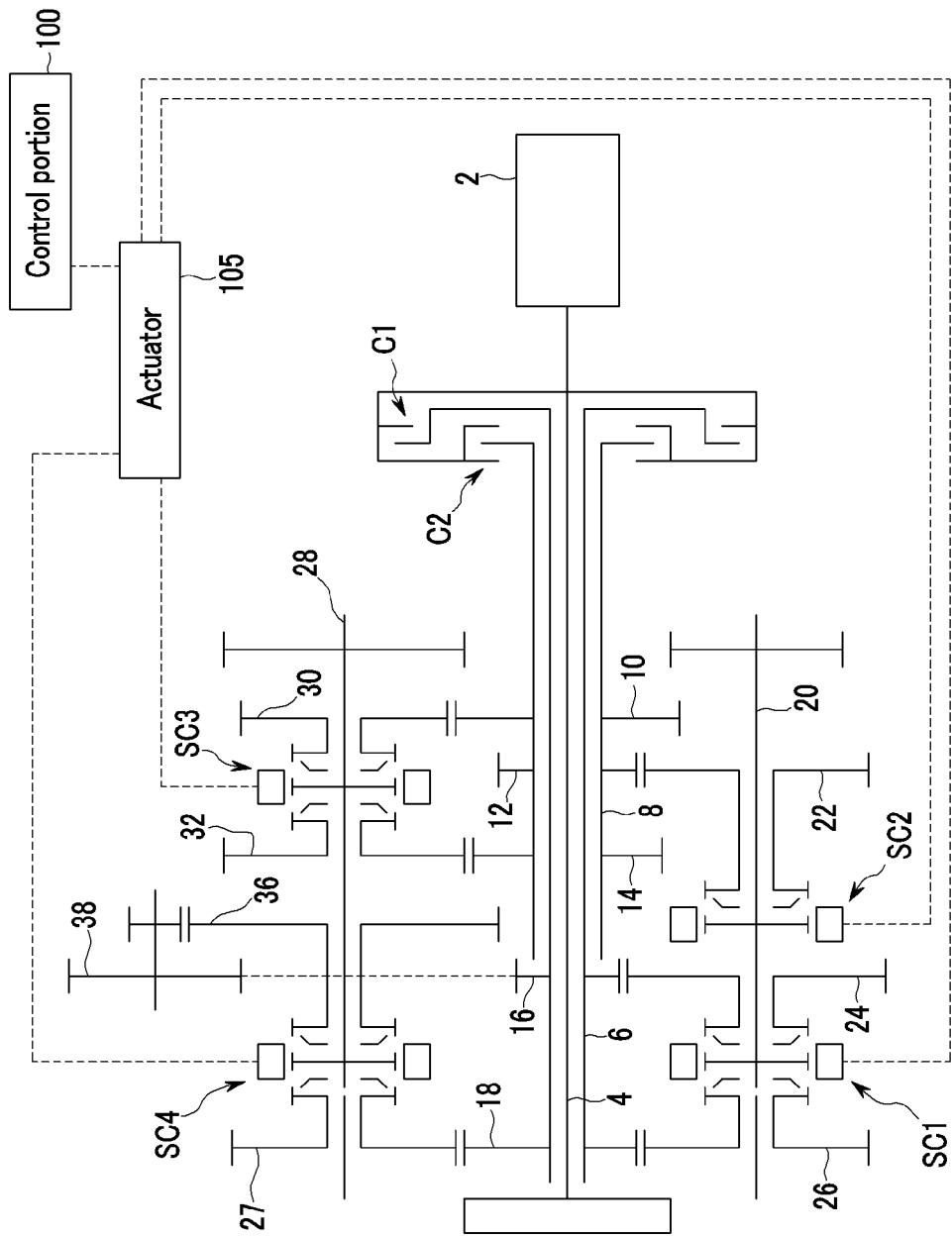
FIG. 1 is a schematic diagram of an exemplary dual clutch transmission according to an exemplary embodiment of the present invention.

FIG. 1 is a schematic diagram of a dual clutch transmission according to various exemplary embodiments of the present invention.

Referring to FIG. 1, a driving device includes an engine 2, a base input shaft 4, first and second clutches C1 and C2, a first input shaft 6, a second input shaft 8, a first speed input gear 16, a second speed input gear 12, a third speed input gear 18, a fourth speed input gear 14, and a fifth speed input gear 10.

Also, the driving device further includes a first speed output gear 24, a second speed output gear 22, a third speed output gear 26, a fourth speed output gear 32, a fifth speed output gear 27, a sixth speed output gear 30, a reverse input gear 38, a reverse output gear 36, a first output shaft 20, a second output shaft 28, a first synchronizer SC1, a second synchronizer SC2, a third synchronizer SC3, and a fourth synchronizer SC4.

The driving device includes a control portion 100 and a device for preventing double engagement 105 that are respectively connected to the synchronizers (SC1, SC2, SC3, and SC4). The control portion 100 substantially controls the synchronizers (SC1, SC2, SC3, and SC4) and a device for preventing double engagement 105 so as to shift gear up and down.

For example, the device for preventing double engagement 105 prevents the fifth speed output gear 27 and the third speed output gear 26 from being simultaneously connected to the first and second output shafts 20 and 28.

That is, when shifting speed from a third speed to a fifth speed, the third speed output gear 26 is disengaged from the first synchronizer SC1 and the fourth synchronizer SC4 is engaged with the fifth speed output gear.

The respective synchronizers (SC1, SC2, SC3, and SC4) are connected to a shift fork (315, FIG. 2) and an actuator of a transmission.

Figure 2:
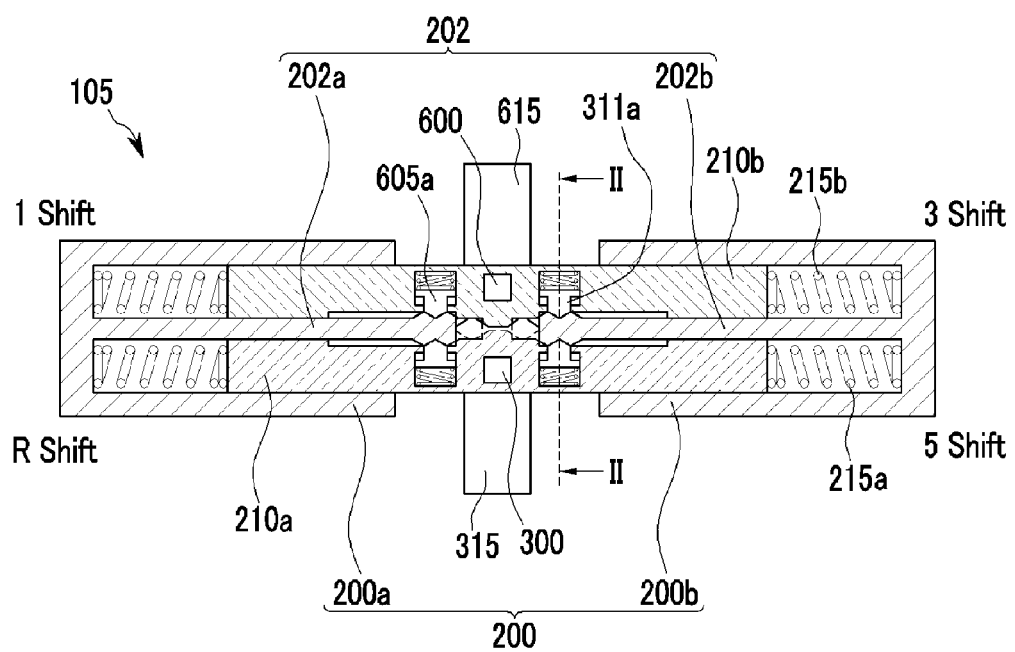
FIG. 2 is a cross-sectional view of a device for preventing double engagement that is mounted on a dual clutch transmission according to an exemplary embodiment of the present invention.

FIG. 2 is a cross-sectional view of a device for preventing double engagement 105 that is mounted on a dual clutch transmission according to various exemplary embodiments of the present invention.

Referring to FIG. 2, the device for preventing double engagement 105 includes a case 200 comprising a first case 200a and a second case 200b, a control bar 202 including a first control bar 202a and a second control bar 202b, a first rail 210a, a second rail 210b, a first spring 215a, a second spring 215b, a first shift fork 315, a second shift fork 615, a first shift rug 300 and a second shift rug 600.

The first and second cases 200a and 200b are disposed at either side. The first control bar 202a is disposed at the middle of the inside of the first case 200a and the second control bar 202b is disposed at the middle of the inside of the second case 200b.

The first rail 210a and the second rail 210b are respectively disposed at both upper and lower portions of the control bars 202a and 202b. The first rail 210a is elastically supported by the first spring 215a at both sides thereof and the second rail 210b is elastically supported by the second spring 215b at both sides thereof.

The first control bar 202a and the second control bar 202b are disposed in one straight line and the first and second rails 210a and 210b slide on both sides of these 202a and 202b.

When the first rail 210a and the second rail 210b are in the middle position the gear is in neutral. When the second rail 210b moves to the left the gear is in first speed, and when the second rail 210b moves to the right the gear is in third speed. When the first rail 210a moves to the left the gear is in reverse, and when the first rail 210a moves to the right the gear is in fifth speed.

A first shift fork 315 and first shift rug 300 are disposed in the first rail 210a and these are moved by an actuator in left/right or up/down directions. A second shift fork 615 and a second shift rug 600 are also disposed in the second rail 210b.

Particularly, in various embodiments of the present invention, when the second rail 210b is in the third speed and the first rail 210a is in the neutral position and, if the first rail 210a moves to the fifth speed position, the second rail 210b automatically moves to the neutral position by the second spring 215b. Accordingly, it is prevented that the third speed and the fifth speed are simultaneously operated.

Figure 3A:
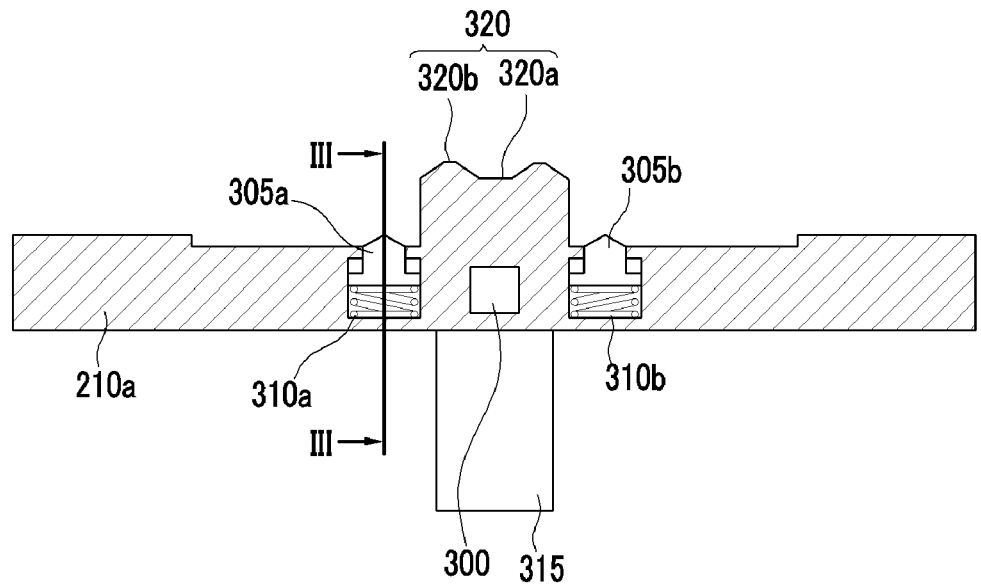
FIGS. 3(a), 3(b) and 3(c) are partial exploded sectional views of a device for preventing double engagement according to an exemplary embodiment of the present invention.
Figure 3B:
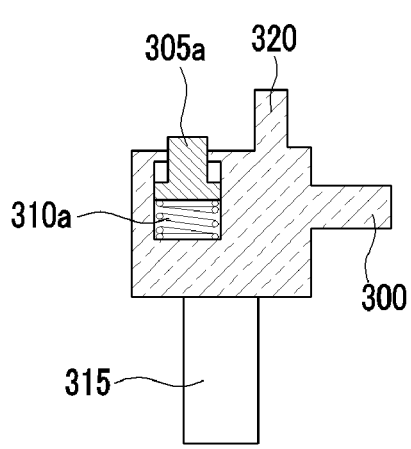
Figure 3C:
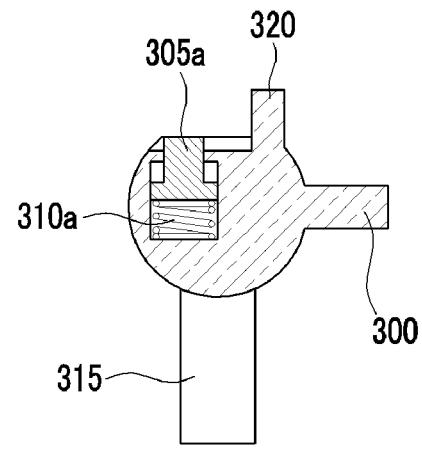
Figure 4:
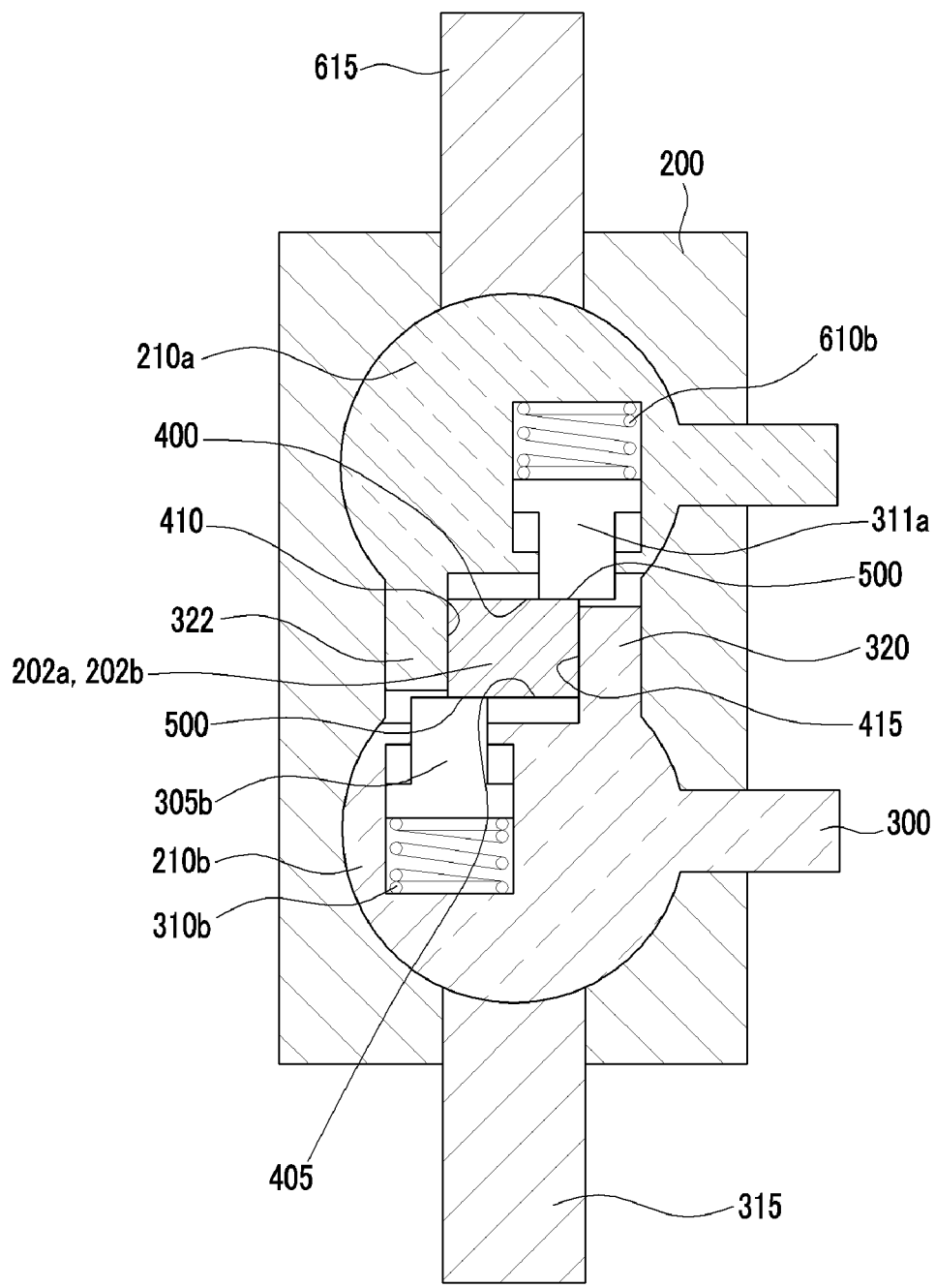
FIG. 4 is a cross-sectional view of a device for preventing double engagement according to line II-II of FIG. 2.

A structure of the device for preventing double engagement 105 is explained in detail referring to FIG. 3 and FIG. 4.

FIG. 3 is a partial exploded sectional view of a device for preventing double engagement 105 according to various embodiments of the present invention. FIGS. 3 (b) and (c) are the other cross-sectional side views of (a).

Referring to FIGS. 3(a), (b), and (c), the first shift rug 300 and the first shift fork 315 are formed in the first rail 210a.

A first stopper 305a, a second stopper 305b, a third spring 310a, and a fourth spring 310b are mounted on the first rail 210a. Also, a first release rug 320 is formed in the middle of the first rail 210a.

The first stopper 305a is elastically supported upwards by the third spring 310a and the second stopper 305b is elastically supported upwards by the fourth spring 310b.

End portions of the first and second stoppers 305a and 305b protrude from one upper surface of the first rail 210a by the third and fourth springs 310a and 310b.

A dent 320a is formed in the middle of the first release rug 320 and knolls 320b are formed at both sides based on the dent 320a. The first shift rug 300 and the first shift fork 315 are connected to an actuator that substantially shifts speed.

FIGS. 3(b) and (c) show cross-sectional side views according to line III-III of FIG. 3(a) in another exemplary embodiment, wherein the section of the first rail 210a has a quadrangular shape in (b), and the section of the first rail 210a has a circular shape in (c).

The first release rug 320 and the first and second stoppers 305a and 305b are formed in an upper direction and the first shift fork 315 is formed in a lower direction of the first rail 210a. Also, the first shift rug 300 is formed in a side direction of the first rail 210a.

FIG. 4 is a cross-sectional view of a device for preventing double engagement according to line II-II of FIG. 2, wherein the section of the first and second rails 210a and 210b have a circular shape as shown in FIG. 3(C).

As shown in FIG. 4, the section of the second control bar 202b has a quadrangular shape, and the second control bar 202b has a first surface 400 and a second surface 405 that are placed opposite each other and a third surface 410 and a fourth surface 415 that are placed each other.

The second rail 210b is disposed at the first surface 400 (upper portion) of the second control bar 202b, and the first rail 210a is disposed at the second surface 405 (lower portion) of the second control bar 202b. Also, the second release rug 322 extends from the second rail 210b downwards and is disposed at the third surface 410 of the second control bar 202b.

Further, the first release rug 320 extends from the first rail 210a upwards and is disposed on the fourth surface 415 of the second control bar 202b.

Further, the end surface of the fourth stopper 311a is disposed to face or contact the first surface 400 of the second control bar 202b and the end surface of the first release rug 320 in the first rail 210a, and the end surface of the second stopper 305b is disposed to face or contact the end surface of the second surface 405 and the second release rug 322 in the second rail 210b.

Figure 5:
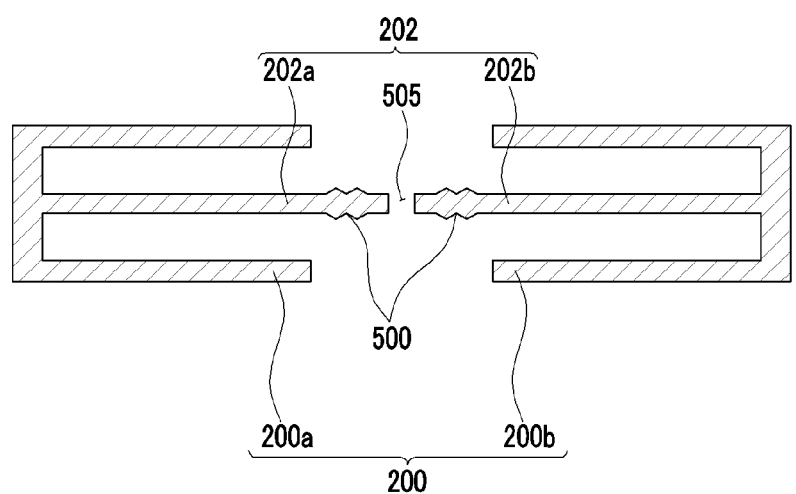
FIG. 5 is a cross-sectional view of a casing that is mounted on a device for preventing double engagement according to an exemplary embodiment of the present invention.

FIG. 5 is a cross-sectional view of a casing that is mounted on a device for preventing double engagement according to an exemplary embodiment of the present invention.

As shown in FIG. 5, the first control bar 202a and the second control bar 202b are disposed inside the casing 200. A hole 505 is formed between the first control bar 202a and the second control bar 202b.

Grooves 500 are formed adjacent to the hole 505 in ends of the first and second control bars 202a and 202b. The grooves 500 are disposed around the hole 505.

Referring to FIGS. 2, 4 and 5, the fourth stopper 311a is mounted in the groove 500 according to the movement of the second rail 210b. Also, the second stopper 305b can be mounted in the groove 500 according to the movement of the first rail 210a.

FIG. 6A to FIG. 6D are cross-sectional views showing operating statuses of a device for preventing double engagement according to an exemplary embodiment of the present invention.

Figure 6A:
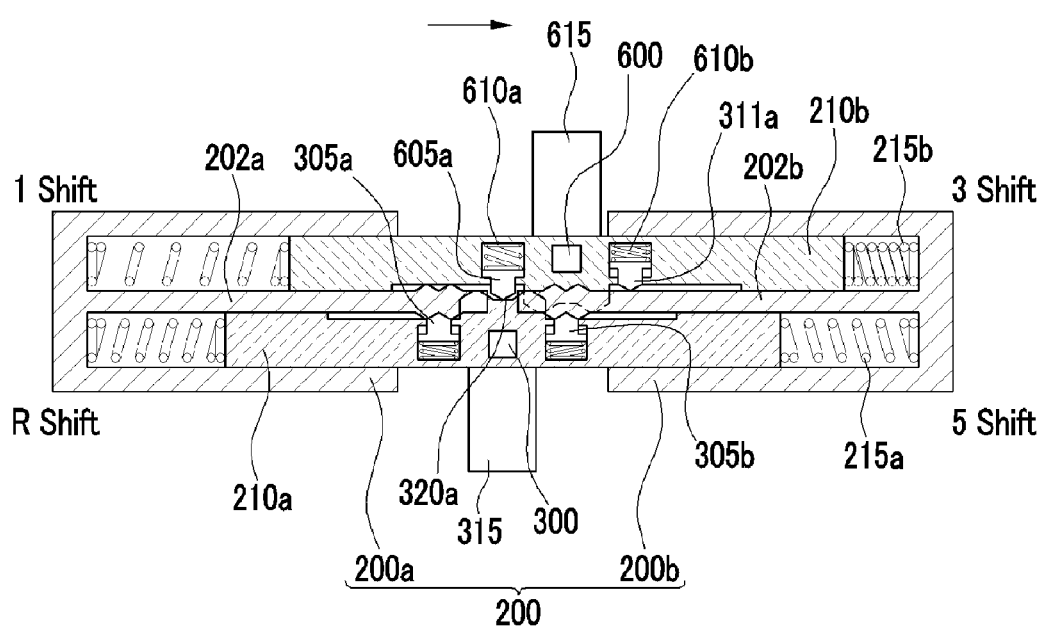
FIG. 6A to FIG. 6D are cross-sectional views showing operating statuses of a device for preventing double engagement according to an exemplary embodiment of the present invention.

As shown in FIG. 6A, when the second rail 210b moves in a right direction by an actuator, a third stopper 605a is inserted into the hole 505 (FIG. 5) by the fifth spring 610a.

At this time, the third stopper 605a is mounted on the dent 320a (FIG. 3) of the first release rug 320 that is formed in the first rail 210a.

As stated above, the third stopper 605a is inserted into the hole 505 (FIG. 5) such that the third speed of a transmission is sustained.

Figure 6B:
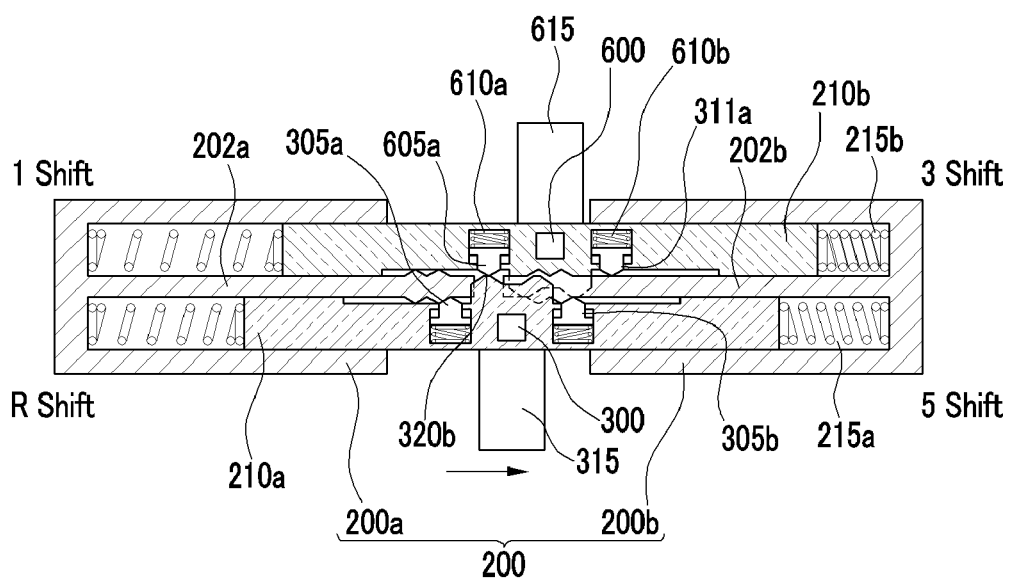

Next, as shown in FIG. 6B, when the first rail 210a moves in a right direction by an actuator, the knoll 320b of the first release rug 320 (FIG. 3) lifts up the third stopper 605a.

Figure 6C:
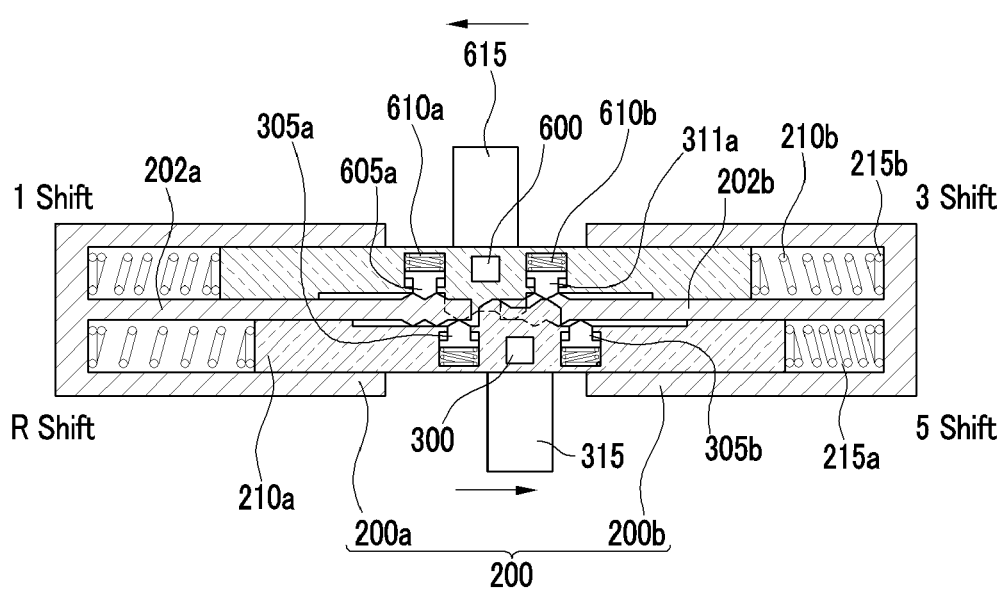

Next, as shown in FIG. 6C, the second rail 210b is returned to the middle position (neutral) by the second spring 215b and the third stopper 605a and the fourth 311a are inserted into the groove 500 by the fifth spring 610a and the sixth spring 610b respectively.

Figure 6D:
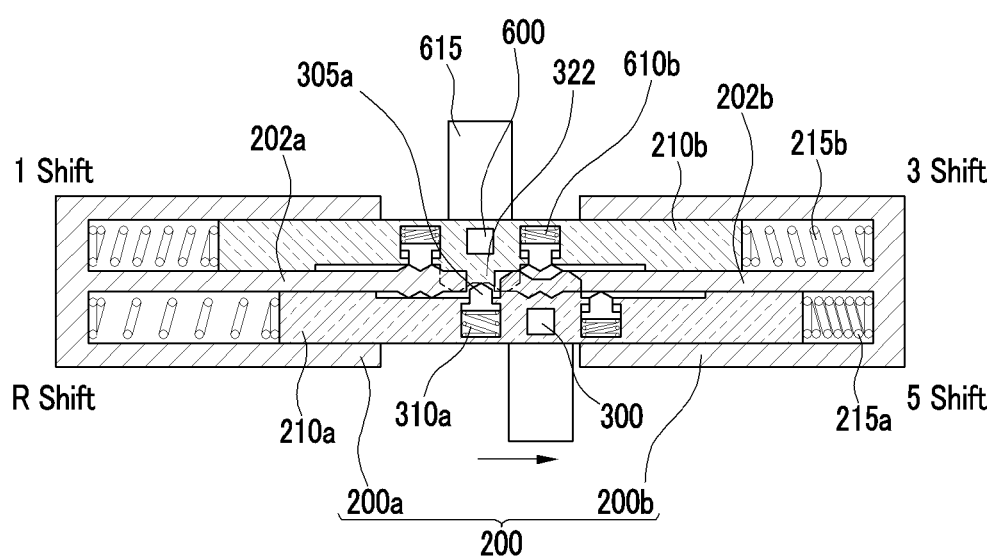

Next, as shown in FIG. 6D, the first stopper 305a of the first rail 210a is inserted into the hole 505 and thus the position of the first rail 210a is retained. Accordingly, the fifth speed is completed and retained.

As stated above, the second rail 210b is not moved by an actuator in the third speed position of the second rail 210b, but the third speed position of the second rail 210b is released by simply moving the first rail 210a to the position of the fifth speed. Accordingly, the third speed and the fifth speed are not simultaneously operated.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A dual clutch transmission that is equipped with a double clutch, including a first clutch and a second clutch, and a device for preventing double engagement, wherein the device for preventing double engagement comprises:
    a control bar in which a hole is formed from a first surface to a second surface that is opposite to the first surface;
    a first rail and a second rail that are respectively slidably disposed along the first surface and the second surface of the control bar;
    first elastic members that respectively bias the first rail and the second rail to maintain a neutral position in a normal state;
    a first stopper member and a second stopper member that are mounted in respective inner grooves of the first rail and the second rail and in which the end portions thereof are disposed to protrude from the first surface and the second surface thereof, wherein the first and second stopper members are selectively engaged with the control bar;
    second elastic members that elastically support the first and second stopper members and insert the first or second stopper member into the hole according to the movement of the first or second rails; and
    a first release lug and a second release lug that respectively extends from the first rail and the second rail along a third surface and a fourth surface of the control bar, wherein
    a dent, in which the first or second stopper member is mounted, the dent being formed in the middle of an end surface of the first and second release lugs, and a knoll being formed adjacent to the dent so as to push the first or second stopper and release the first or second stopper member from the control bar according to the movement of the first or second rail.

2. The dual clutch transmission of claim 1, wherein the first stopper member is disposed at both sides based on the first release lug and the second stopper member is disposed at both sides based on the second release lug.

3. The dual clutch transmission of claim 1, wherein a first fork and a first shift lug for shifting are connected to the first rail.

4. The dual clutch transmission of claim 1, wherein a second fork and a second shift lug for shifting are connected to the second rail.

5. A vehicle comprising the dual clutch transmission of claim 1.

6. The dual clutch transmission of claim 1, wherein a groove is formed on the first and second surface of the control bar and the first and second stopper members are mounted in the groove and thereby the first or second rail is positioned in the neutral position in the normal state.

7. The dual clutch transmission of claim 6, wherein the groove is formed adjacent to the hole.

8. The dual clutch transmission of claim 7, wherein the groove is symmetrically formed around the hole.

9. A dual clutch transmission that is equipped with a double clutch, including a first clutch and a second clutch, and a device for preventing double engagement, wherein the device for preventing double engagement comprises:
    a control bar comprising an upper surface and a lower surface, a hole, and grooves, wherein the hole is configured to pass through the upper surface and the lower surface and the grooves are formed near the hole;
    a first rail and a second rail that are respectively disposed on and below the control bar;
    a first spring biasing the first rail to maintain a neutral position in a normal state;
    a second spring biasing the second rail to maintain a neutral position in a normal state;
    a first stopper member and a second stopper member that are mounted in respective inner grooves of the first rail and the second rail and in which the end portions thereof are disposed to selectively protrude from the upper surface and the lower surface wherein the first and second stopper members are selectively engaged with the control bar;
    elastic members that elastically support the first and second stopper members and insert the first or second stopper members into the hole according to the movement of the first or second rail; and a first release lug and a second release lug that respectively extend from the first rail and the second rail along a third surface and a fourth surface at both sides of the control bar, wherein a dent, in which the first or second stopper mounts, being formed in the middle of an end surface of the first and second release lugs, and wherein the first and second release lugs have a knoll formed adjacent to the dent so as to push the first or second stopper member and release the first or second member from the control bar according to the movement of the first or second rail.

10. A vehicle comprising the dual clutch transmission of claim 9.

11. A dual clutch transmission that is equipped with a double clutch, including a first clutch and a second clutch, and a device for preventing double engagement, wherein the device for preventing double engagement comprises:

first and second cases;

first control bar disposed at the middle of the inside of the first case and extending in a longitudinal direction thereof;

second control bar disposed at the middle of the inside of the second case and extending in a longitudinal direction thereof, wherein a hole is formed between one end portion of the first control bar and one end portion of the second control bar;

a first rail slidably disposed on first surfaces of the first and second control bars;

a second rail slidably disposed on second surfaces of the first and second control bars;

first elastic member and second elastic member that respectively bias the first and second rails to maintain a neutral position in a normal state;

a first stopper mounted in an inner groove of the first rail and one end of which protrudes toward the first control bar, the first stopper moving in the first case, wherein a third elastic member supports the first stopper and selectively inserts the first stopper into the hole of the control bar according to the movement of the first rail;

a second stopper mounted in an inner groove of the first rail and one end of which protrudes toward the second control bar, the second stopper moving in the second case, wherein a fourth elastic member supports the second stopper and selectively inserts the second stopper into the hole of the control bar according to the movement of the first rail;

a third stopper mounted in an inner groove of the second rail and one end of which protrudes toward the first control bar, the third stopper moving in the first case, wherein a fifth elastic member supports the third stopper and selectively inserts the third stopper into the hole of the control bar according to the movement of the second rail;

a fourth stopper mounted in an inner groove of the second rail and one end of which protrudes toward the second control bar, the fourth stopper moving in the second case, wherein a sixth elastic member supports the fourth stopper and selectively inserts the fourth stopper into the hole of the control bar according to the movement of the second rail;

a first release lug extending from the first rail between the first and second stoppers, the first release lug including a dent to selectively receive the third or fourth stopper and a knoll formed adjacent to the dent to selectively release the third or fourth stopper from the control bar according to movement of the first rail; and a second release lug extending from the second rail between the third and fourth stoppers, wherein the second release lug includes a dent to selectively receive the first or second stopper and a knoll formed adjacent to the dent to selectively release the first or second stopper from the control bar according to movement of the second rail.

12. A vehicle comprising the dual clutch transmission of claim 11.

13. The dual clutch transmission of claim 11, wherein first and second grooves are formed on the first surface of the respective first and second control bars at the one end thereof and third and fourth grooves are formed on the second surface of the respective first and second control bars at the one end thereof, the first and second stopper being mounted in the first and second grooves to maintain the first rail in the neutral position in the normal state and the third and fourth stopper being mounted in the third and fourth grooves to maintain the second rail in the neutral position in the normal state.

14. The dual clutch transmission of claim 13, wherein a first fork and a first shift lug for shifting are connected to the first rail.

15. The dual clutch transmission of claim 13, wherein a second fork and a second shift lug for shifting are connected to the second rail.

16. The dual clutch transmission of claim 13, wherein the first, second, third, and fourth grooves are formed adjacent to the hole.

17. The dual clutch transmission of claim 16, wherein the first and second grooves are symmetrically formed with respect to the hole and the third and fourth grooves are symmetrically formed with respect to the hole.

* * * * *